(12) United States Patent
Chen

(10) Patent No.: US 6,746,219 B1
(45) Date of Patent: Jun. 8, 2004

(54) WATER PUMP MOTOR

(76) Inventor: Chi-Der Chen, 85-1, Shuiyuan Road, Taipei (TW)

( * ) Notice: Subject to any disclaimer, the term of this patent is extended or adjusted under 35 U.S.C. 154(b) by 0 days.

(21) Appl. No.: 10/317,805

(22) Filed: Dec. 11, 2002

(51) Int. Cl.[7] .......................... F04B 17/00; F04B 35/04
(52) U.S. Cl. ................... 417/424.1; 417/423.14
(58) Field of Search ................ 417/424.1, 423.3, 417/423.14, 423.15, 65

(56) References Cited

U.S. PATENT DOCUMENTS

| | | | | |
|---|---|---|---|---|
| 4,218,195 A | * | 8/1980 | Shure | 417/411 |
| 4,283,645 A | * | 8/1981 | Hofmann | 310/87 |
| 5,131,821 A | * | 7/1992 | Marioni et al. | 417/423.3 |

* cited by examiner

*Primary Examiner*—Justine Yu
*Assistant Examiner*—Han L Liu
(74) *Attorney, Agent, or Firm*—Pro-Techtor International Services

(57) ABSTRACT

A water pump motor is constructed to include a housing, the housing having a conical water guide chamber gradually expanding from the top side toward the bottom side, water inlets around the periphery for guiding water into the water guide chamber, and an air passage for guiding air into the water guide chamber to mix with water, a vane wheel fastened to a motor shaft inside the housing and suspended in the water guide chamber, the vane wheel having triangular vanes radially arranged at the top around the motor shaft, a hollow water outlet pipe holder coupled to the bottom shell to hold a water outlet pipe, the water outlet pipe holder having radial dampers equiangularly spaced around the inside wall to guide water toward the water outlet pipe.

5 Claims, 5 Drawing Sheets

WATER PUMP MOTOR

BACKGROUND OF THE INVENTION

1. Field of the Invention

The present invention relates to a water pump motor for use in an aquarium or the like and, more particularly to such a water pump motor, which has water inlets provided above the water outlet pipe so that water can efficiently pumped to the water outlet pipe, a conical water guide chamber that concentrates intake water, radial dampers that guide water from the conical water guide chamber to the water outlet pipe, and an air passage with an air inlet pipe for guiding outside fresh air into the water guide chamber to mix with water flowing toward the water outlet pipe.

2. Description of the Related Art

FIG. 1 illustrates a water pump motor used in an aquarium according to the prior art. As illustrated, the water pump motor comprises a housing 2, a downwardly extended water inlet pipe 21 provided at the bottom side of the housing 2, a water outlet pipe 22 transversely provided above the water inlet pipe 21, a water guide chamber 23 defined inside the housing 2 in communication between the water inlet pipe 21 and the water outlet pipe 22, and a vane wheel 24 suspended in the water guide chamber 23 and connected to the motor shaft (not shown) inside the housing 2. This design of water pump motor is not efficient in use. Because the water outlet pipe 22 is disposed above the water inlet pipe 21, much horsepower is required to pump water from upwards from the water inlet pipe 21 to the water outlet pipe 22. Further, this structure of water pump motor has no means to guide outside fresh air into the inside of the housing 2 for mixing with water passing through the water guide chamber 23.

SUMMARY OF THE INVENTION

The present invention has been accomplished to provide a water pump motor, which eliminates the aforesaid drawbacks. According to one aspect of the present invention, multiple water inlets are provided around the periphery of the housing of water pump motor near the top to guide water downwardly into the inside of the housing in different directions toward a water outlet pipe at the bottom side of the housing. According to another aspect of the present invention, the housing of the water pump motor is provided with an air passage and an air inlet pipe connected with an air hose with an air flow rate regulator for guiding outside fresh air into the inside of the housing to mix with water. According to still another aspect of the present invention, the vane wheel of the water pump motor has triangular vanes radially arranged at the top side around the motor shaft, and the water outlet pipe holder connecting the water outlet pipe to the housing of the water pump motor has radial dampers equiangularly spaced around the inside wall for guiding water from the water inlets toward the water outlet pipe efficiently.

DETAILED DESCRIPTION OF THE PREFERRED EMBODIMENT

Figure 1:
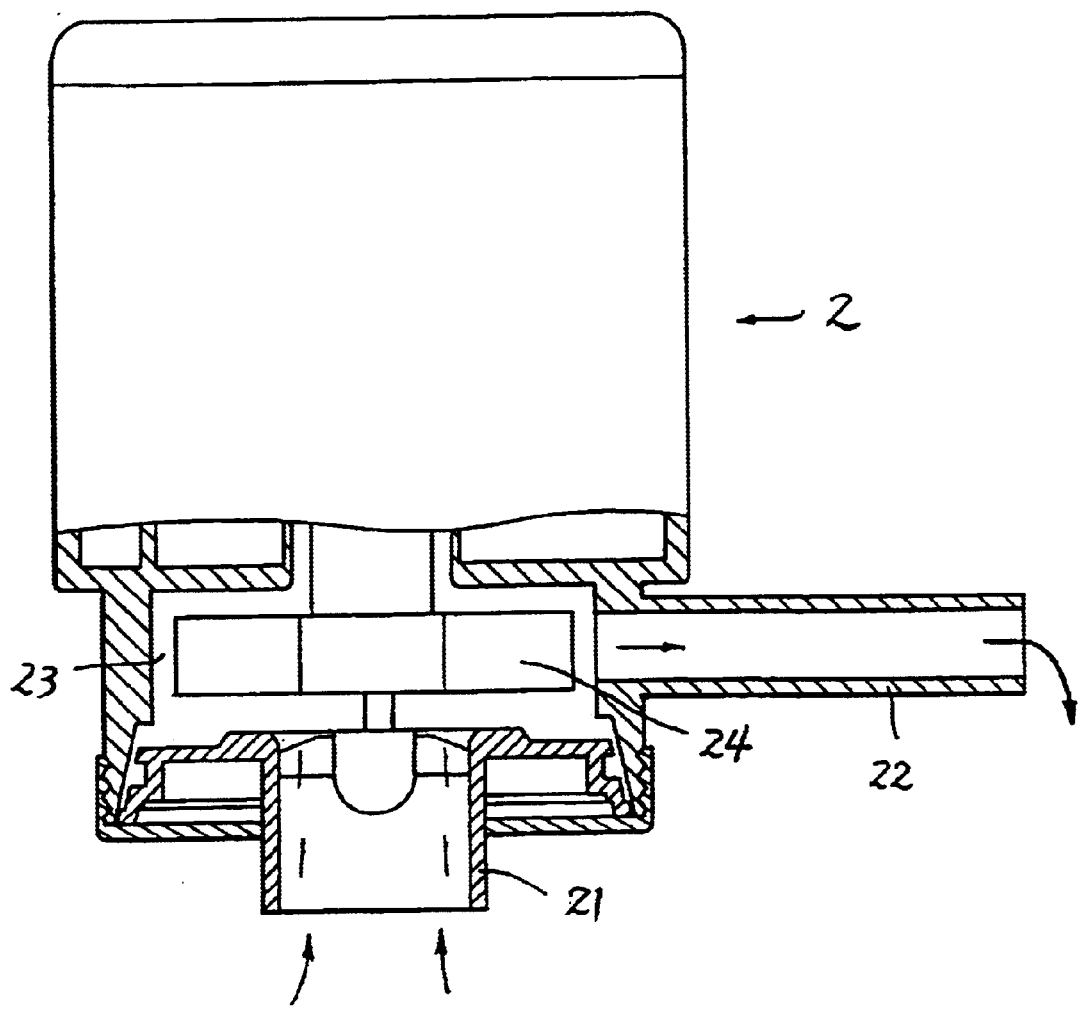
FIG. 1 is a schematic sectional view of a water pump motor according to the prior art, showing the water flowing direction.
Figure 2:
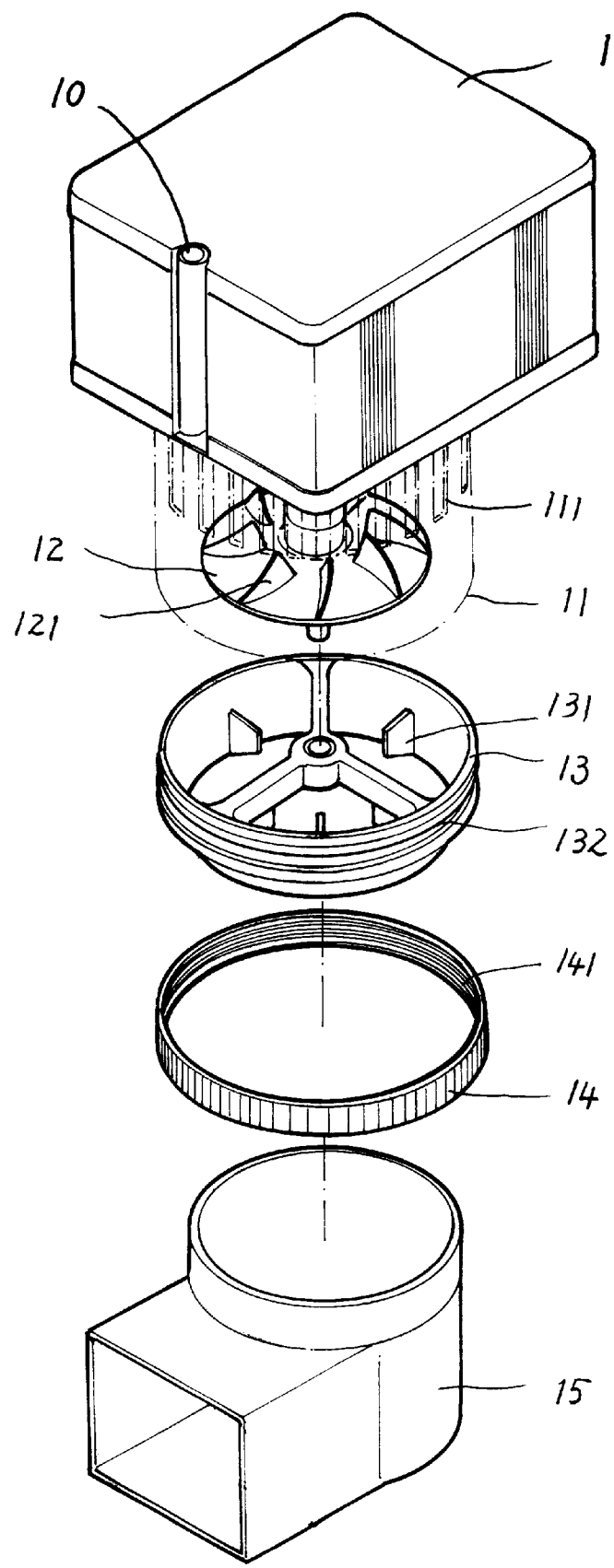
FIG. 2 is a perspective exploded view of a water pump motor according to the present invention.
Figure 3:
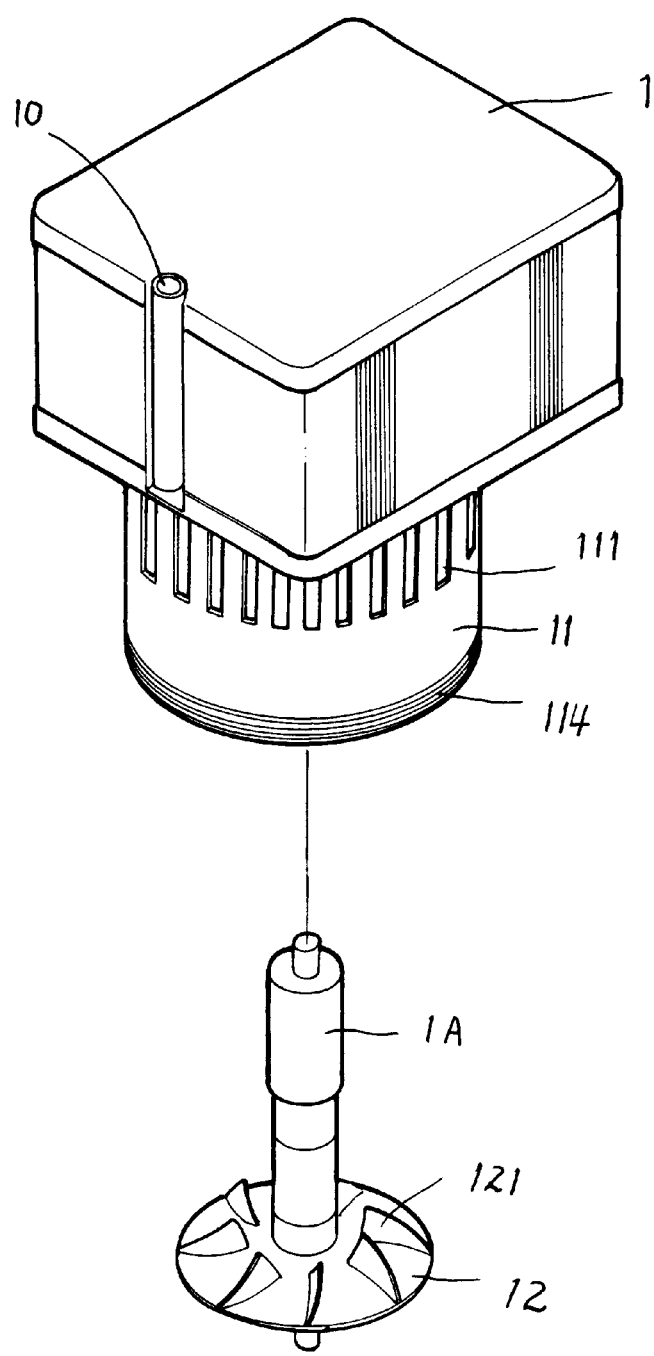
FIG. 3 is another exploded view of the water pump motor according to the present invention.
Figure 4:
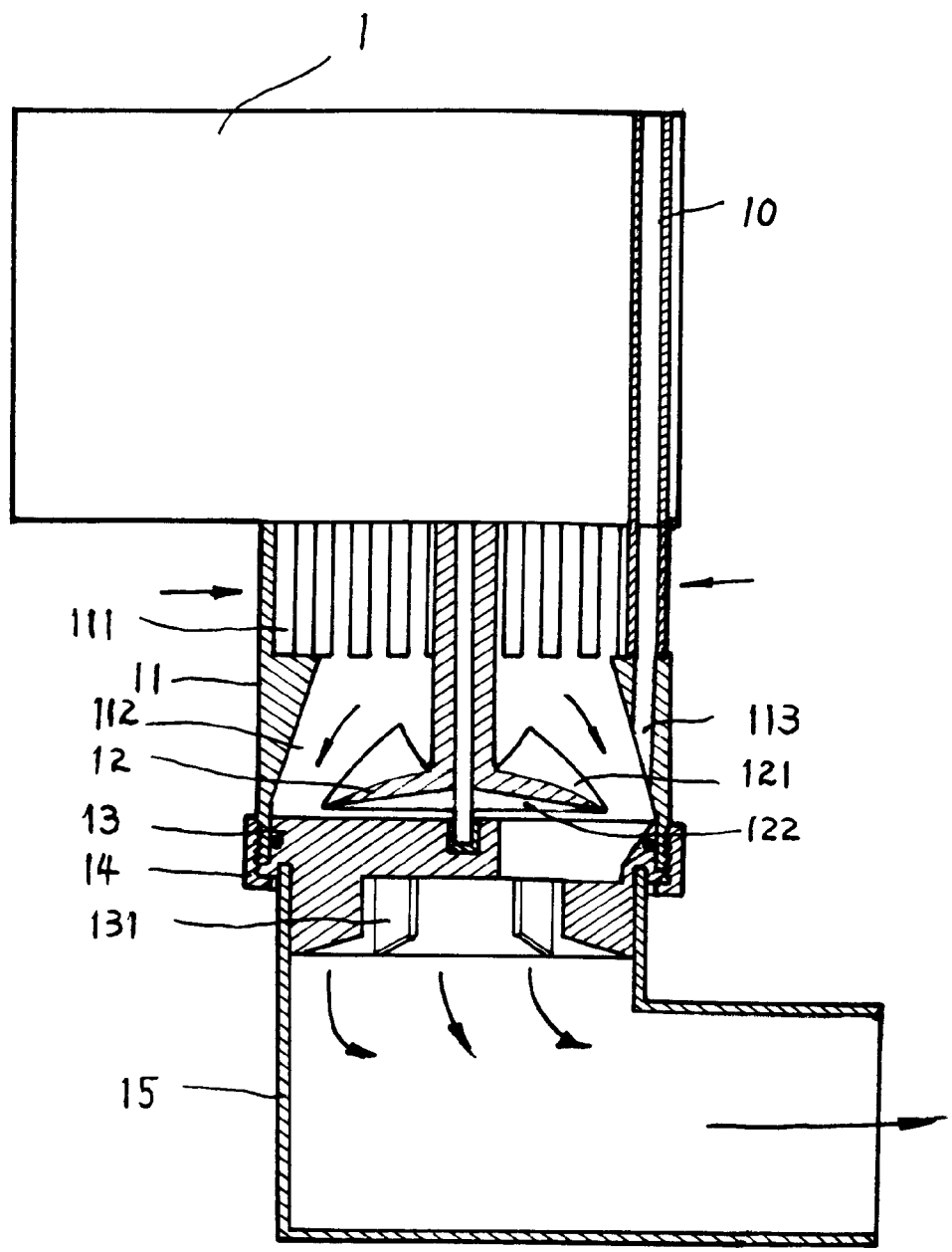
FIG. 4 is a schematic sectional view of the present invention, showing the water flowing direction.
Figure 5:
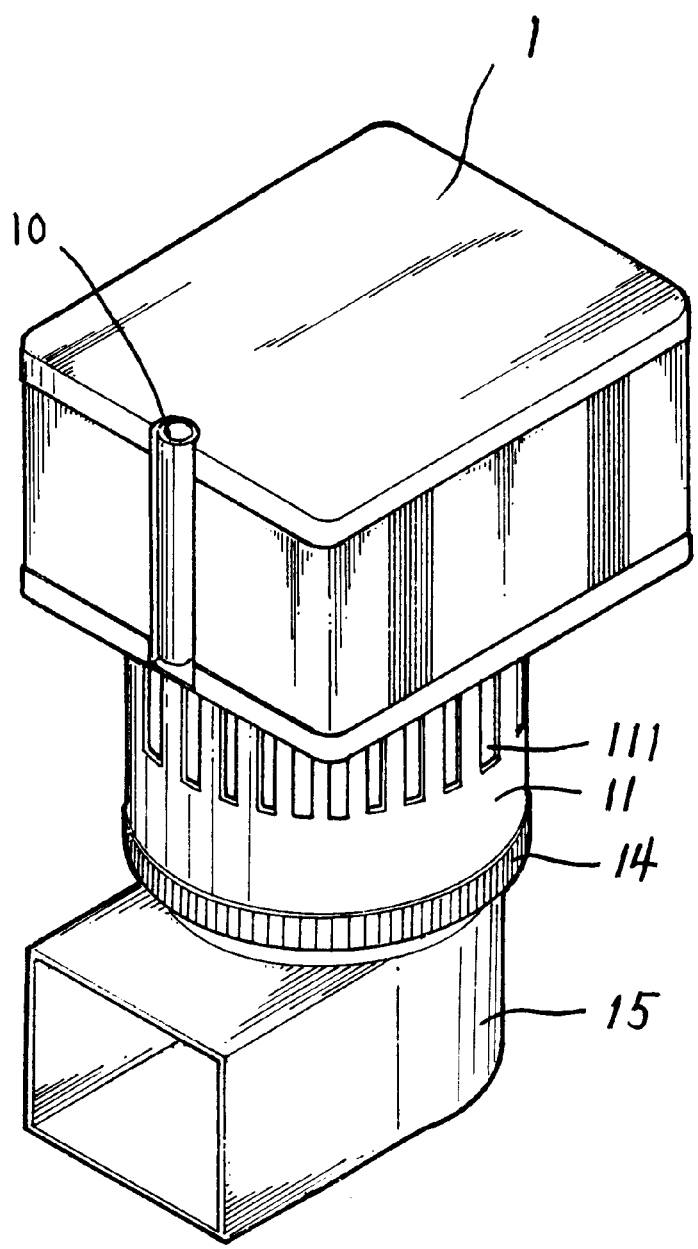
FIG. 5 is an elevational view of the water pump motor according to the present invention.

Referring to FIGS. 2–4, a water pump motor is adapted for use in an aquarium, comprising a housing 1, a motor shaft 1A, a vane wheel 12, a water outlet pipe holder 13, a lock ring 14, and a water outlet pipe 15.

The housing 1 comprises an air inlet pipe 10, a downwardly extended bottom shell 11, a conical water guide chamber 112 defined within the bottom shell 11, a plurality of water inlets 111 through the bottom shell 11 in fluid communication with the water guide chamber 112, an inside air passage 113 axially provided in the bottom shell 11 in communication between the air inlet pipe 10 and the water guide chamber 112, and an outer thread 114 extended around the periphery of the bottom end of the bottom shell 11.

The vane wheel 12 is fastened to the motor shaft 1A provided inside the housing 1, having triangular vanes 121 radially arranged at the top side around the motor shaft 1A and a conical bottom recess 122 for easy removal from the injection-molding mold.

The water outlet pipe holder 13 is a hollow member coupled to the bottom side of the bottom shell 11 of the housing 1, having radial dampers 131 equiangularly spaced around the inside wall and an outer thread 132 extended around the periphery.

The lock ring 14 has an inner thread 141 threaded onto the outer thread 132 of the water outlet pipe holder 13 and the outer thread 114 of the bottom shell 11 of the housing 1 to secure the water outlet pipe 15 to the water outlet pipe holder 13, enabling the water outlet pipe 15 to be rotated on the water outlet pipe holder 13 through 360°.

Referring to FIG. 4, an air hose (not shown) is connected to the air inlet pipe 10 of the housing 1 and extended to the outside of the aquarium. An air flow rate regulator may be installed in between the air inlet pipe 10 and the air hose to control the flow rate of air. When the vane wheel 1 rotated with the motor shaft 1A, water evenly flows through the water inlet holes 111 in different angles within 360° into the water guide chamber 112, and guided by the triangular vanes 121 of the vane wheel 12 and the dampers 131 of the water outlet pipe holder 13 toward the water outlet pipe 15, which guides water to the aquarium or filter trough. At the same time, outside air passes through the air hose and the air inlet pipe 10 to the water guide chamber 112 via the inside air passage 113 to mix with water flowing toward the water outlet pipe 15.

Because the water guide chamber 112 is a conical chamber having a diameter gradually increasing in vertical direction from the water inlets 111 toward the water outlet pipe 15, water is efficiently guided to the water outlet pipe 15 with less horsepower of the water pump motor. The triangular vanes 121 of the vane wheel 12 and the dampers 131 of the water outlet pipe holder 13 concentrate the flowing of water toward the water outlet pipe 15, enhancing the water pumping action of the water pump motor.

A prototype of water pump motor has been constructed with the features of FIGS. 2~5. The water pump motor functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims. For example, water inlet pipes may be provided in the bottom shell 11 of the housing 1 instead of the water inlets 111.

What the invention claimed is:

1. A water pump motor comprising:

a housing, said housing comprising an air inlet pipe, a downwardly extended bottom shell, a conical water guide chamber defined within said bottom shell, said conical water guide chamber having a diameter gradually increasing from a top side of said bottom shell toward a bottom side of said bottom shell, a plurality of water inlets through said bottom shell in fluid communication with said water guide chamber, an inside air passage axially provided in said bottom shell in communication between said air inlet pipe and said water guide chamber, and an outer thread extended around the periphery of said bottom shell;

a motor shaft provided inside said housing;

a vane wheel fastened to said motor shaft, said vane wheel having triangular vanes radially arranged at a top side around said motor shaft;

a hollow water outlet pipe holder coupled to said bottom shell, said water outlet pipe holder having radial dampers equiangularly spaced around an inside wall thereof and an outer thread extended around the periphery thereof;

a water outlet pipe coupled to said water outlet pipe holder for free rotation through 360° and adapted to guide water out of said water guide chamber; and an internally threaded lock ring threaded onto the outer thread of said water outlet pipe holder and the outer thread of said bottom shell of said housing to secure said water outlet pipe to said water outlet pipe holder, for enabling said water outlet pipe to be rotated on said water outlet pipe holder through 360°.

2. The water pump motor as claimed in claim 1, wherein said vane wheel has a conical bottom recess.

3. The water pump motor as claimed in claim 1 wherein said water inlets are formed in one end of a respective water inlet pipe provided at said bottom shell.

4. The water pump motor as claimed in claim 1 wherein said water inlet pipe is connected with an air hose.

5. The water pump motor as claimed in claim 4 wherein said air hose is installed with an air flow rate regulator.

* * * * *